United States Patent [19]

Davis

[11] 3,993,876

[45] Nov. 23, 1976

[54] AUTOMATIC DIALING APPARATUS FOR TELEPHONES

[76] Inventor: William J. Davis, 74 Shady Tree Lane, Carson City, Nev. 89701

[22] Filed: Mar. 20, 1975

[21] Appl. No.: 560,251

[52] U.S. Cl. .......................... 179/90 B; 179/90 CS

[51] Int. Cl.[2] .......................................... H04M 1/45

[58] Field of Search .......... 179/90 B, 90 BD, 90 CS, 179/90 AD, 5 R

[56] References Cited

UNITED STATES PATENTS

| | | | |
|---|---|---|---|
| 1,593,992 | 7/1926 | Smith | 179/90 CS |
| 2,348,758 | 5/1944 | Samburg et al. | 179/90 B |
| 3,118,976 | 1/1964 | Scott | 179/90 B |
| 3,272,925 | 9/1966 | Worley et al. | 179/90 B |
| 3,274,344 | 9/1966 | Young | 179/90 B |
| 3,556,043 | 2/1971 | Nicolas | 179/90 B |

*Primary Examiner*—Kathleen H. Claffy
*Assistant Examiner*—Gerald L. Brigance
*Attorney, Agent, or Firm*—Huebner & Worrel

[57] ABSTRACT

An automatic dialing apparatus, for telephones with conventional circuitry which make station connection by coded patterns of successive circuit interruption, including a self-contained power supply, an electric motor driven by the power supply, a gear system connected to the electric motor, a memory disc embodying a telephone number by the disposition of protuberances in concentric annular coded arrangement thereon, said disc being removably connectable to the gear system for rotation by the motor, and a circuit adapted to interconnect with the conventional circuit having a microswitch disposed to engage the protuberances on the disc so as to interrupt the conventional circuit each time the switch is engaged by a protuberance.

10 Claims, 13 Drawing Figures

AUTOMATIC DIALING APPARATUS FOR TELEPHONES

BACKGROUND OF THE INVENTION

The present invention relates to an automatic dialing apparatus for telephones with conventional circuitry and more particularly to such an apparatus with a self-contained power supply wherein a telephone call number is embodied in a coded configuration of protuberances on a rotating disc adapted to engage a microswitch which interrupts the conventional circuitry so as to "dial" a call to the number embodied on the disc.

The convenience of an automatic dialing system is well known and has been demonstrated in a variety of approaches to the problem. The advantage of such systems is perhaps best evidenced in applications such as procurement departments of businesses regularly dealing with dozens or even hundreds of sources of supply. For applications of this magnitude the acquisition of an expensive automatic system would receive management consideration on the grounds of the economy to be accrued by the time saved in avoiding the manual dialing of thousands of calls annually by employees. There are many circumstances, such as in the typical household, in which the acquistion of a conventional automatic dialer cannot be justified on grounds of economy but must be decided purely on convenience and cost considerations. Consequently it is a rare household which elects to purchase an automatic dialing system because of the cost of the systems available before the present invention.

Present commercially available automatic dialing systems have several disadvantages in addition to their prohibitive cost for most users. Such units are often more complex and sophisticated than is necessary for many applications, utilizing memory devices such as magnetic tape. Furthermore, these units may require a 115 volt a.c. power source for their operation which is often inconveniently located at some distance from the telephone, requiring the use of awkward, unsightly and potentially hazardous extension cords.

It is evident that an economically priced automatic dialer for telephones which is of simple design, is self-contained, requiring no external source of power, and is quickly and easily utilized would fill a long existing need.

SUMMARY OF THE INVENTION

In view of the foregoing, it is an object of the present invention to provide an improved automatic dialing apparatus for telephones.

Another object is to provide such a dialing apparatus which is economical.

Another object is to provide such an apparatus having a self-contained power supply.

Another object is to provide such an apparatus employing a simple mechanical memory device.

Another object is to provide such an apparatus initiated by insertion of a mechanical memory device into a receiver therefor.

Another object is to provide a mechanical memory device for an automatic dialing apparatus for telephones which is easily encoded.

A further object is to provide such an apparatus which uses memory devices that can be compactly and easily stored.

DESCRIPTION OF THE PREFERRED EMBODIMENT

Figure 1:
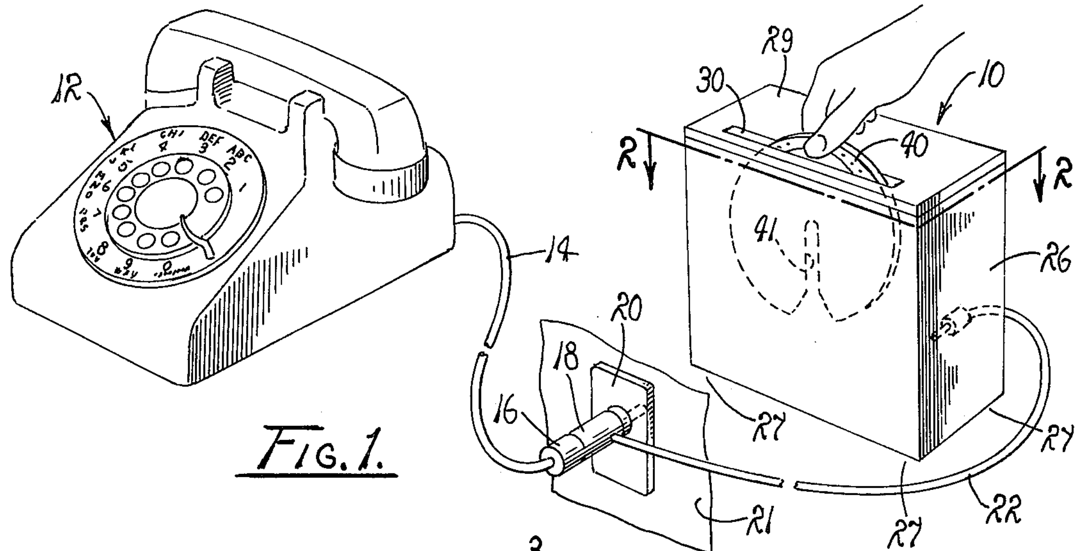
FIG. 1 is a perspective view of an automatic dialing apparatus for telephones embodying the principles of the present invention, shown connected to a telephone, and with a memory disc being shown as manually inserted into the apparatus.

Referring in greater detail to the drawings, an apparatus for automatically dialing telephones embodying the principles of the present invention is shown generally at 10 in FIG. 1 connected to a conventional telephone 12. A standard telephone cable 14 emanates from the telephone and terminates in a plug 16. The plug 16 is inserted into an adapter 18 of the present invention which serves to interconnect electrically in series the apparatus of the present invention and the conventional telephone so tht an electrical interruption in the apparatus also interrupts the conventional telephone circuit. The adapter is inserted in a conventional telephone wall receptacle 20 mounted on a wall fragmentarily represented at 21. A cable 22 connects the adapter with a receptacle 24 mounted on a housing 26. The housing rests on supports 27 borne by a removable bottom 28 for the housing. The housing also has a top panel 29 provided with an elongated aperture 30.

Figure 4:
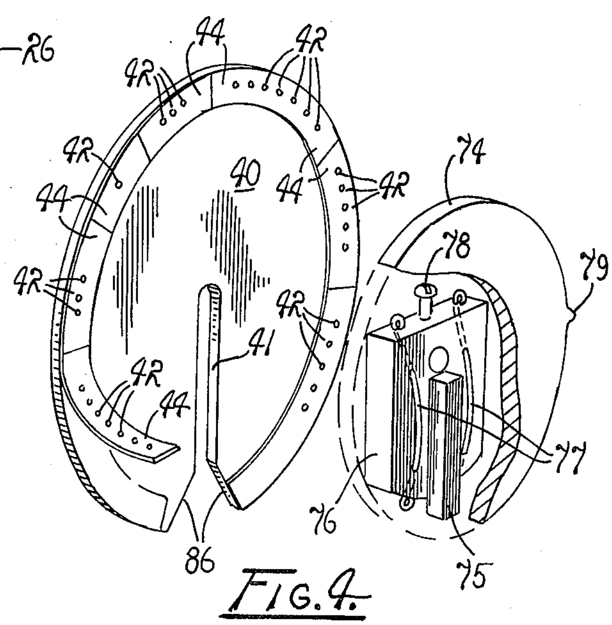
FIG. 4 is a perspective view of a memory disc and receiver of the apparatus of FIG. 1.
Figure 5:
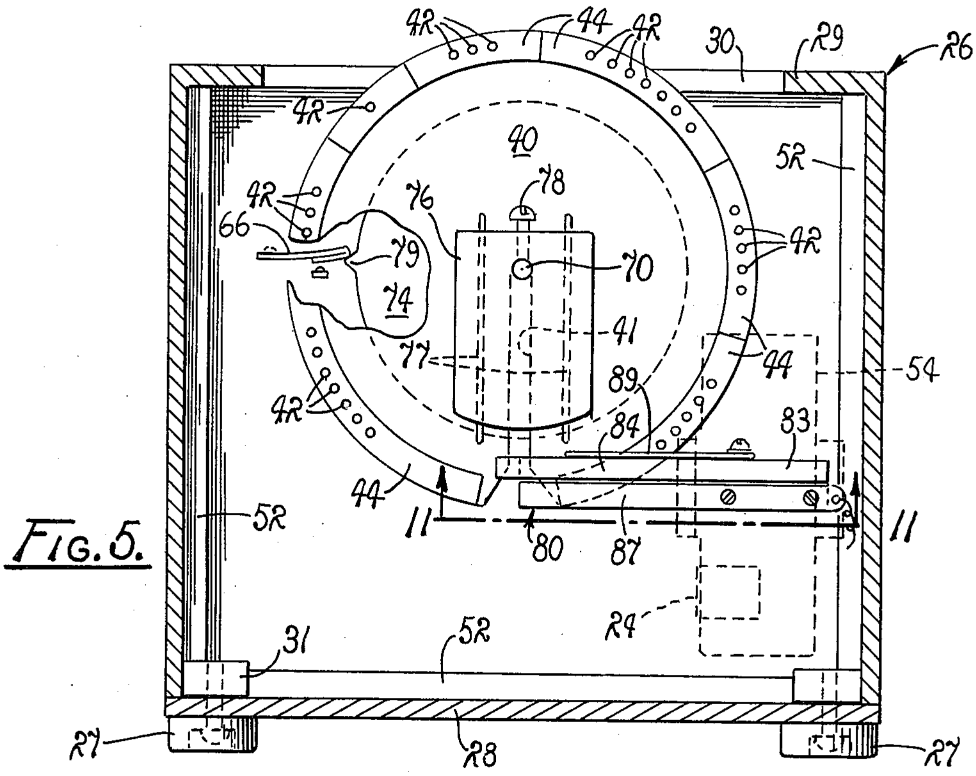
FIG. 5 is a vertical front section taken on line 5—5 of FIG. 2.
Figure 6:
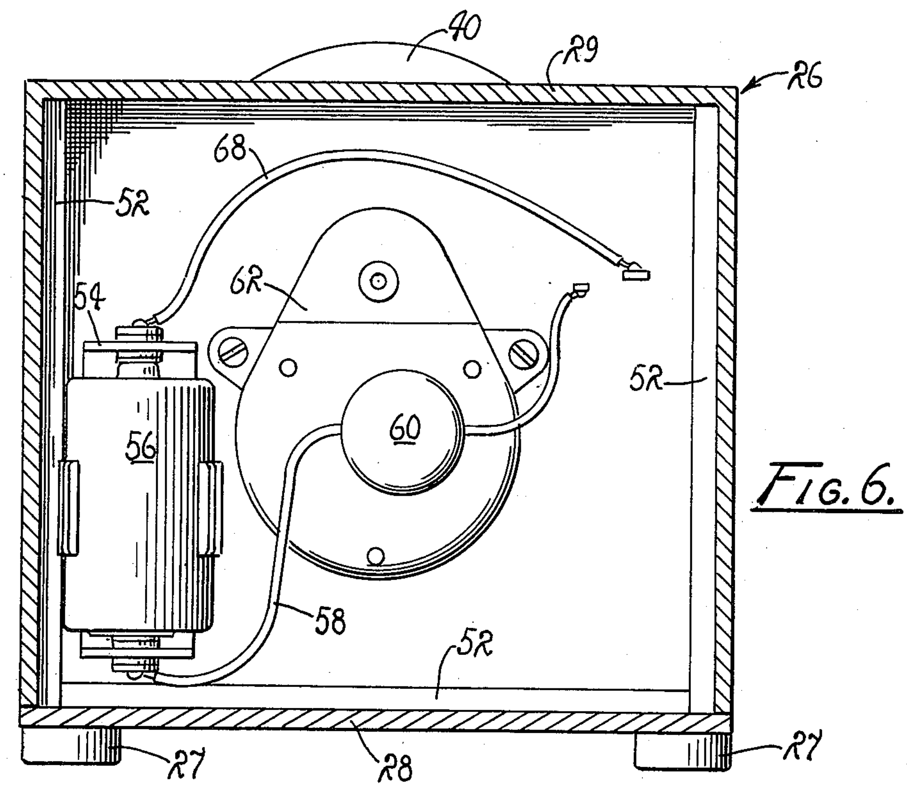
FIG. 6 is a vertical rear section taken on line 6—6 of FIG. 2.

A memory disc 40, shown best in FIG. 4, is shown in FIG. 1 being inserted into the slot 30 thereby serving to actuate the apparatus of the present invention, as will subsequently become apparent. The memory disc contains a radial slot 41 and has a plurality of protuberances 42 disposed in an annular arrangement concentric to the disc. The protuberances are disposed in a succession of series thereof. The protuberances in each series are equally spaced and the successive series equally spaced five times the spacing within the series. The array of protuberances is coded to represent a number to be dialed. For example, if the number to be dialed is 557–3137, the first series contains five protuberances, as best shown in FIG. 5. Proceedng counterclockwise, next there is s space equal to five protuberances, then five protuberances, then a space of the same extent, then seven protuberances, a space, three proturberances, a space, one protuberance, a space, three protuberances, a space and finally seven protuberances. The proturberances may be of any suitable form such as embossed or cut in the disc itself. However, the preferred form is that shown in FIGS. 5 and 6. Arcuate segments 44 of pressure sensitive tape are mounted in end to end relation concentrically of the disc and releasably secured by pressing them against the disc. The segments have the protuberances 42 formed therein by any suitable means.

Figure 2:
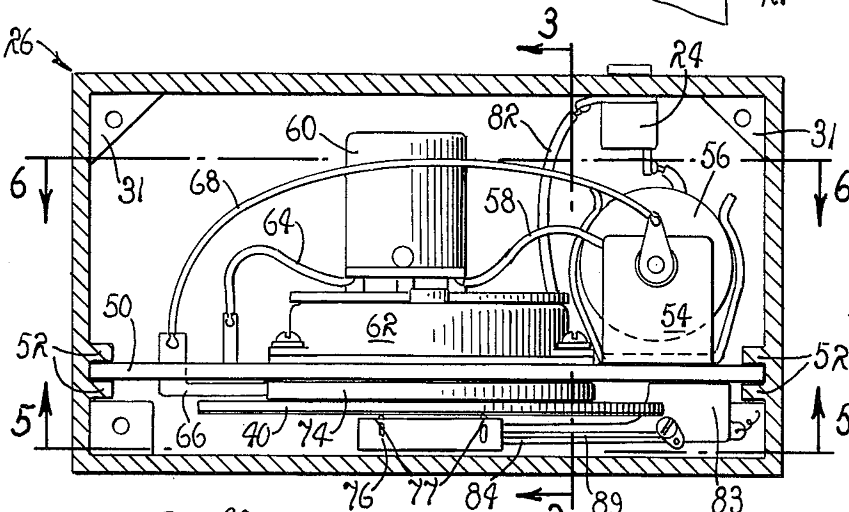
FIG. 2 is a top plan section taken on line 2—2 of FIG. 1.
Figure 3:
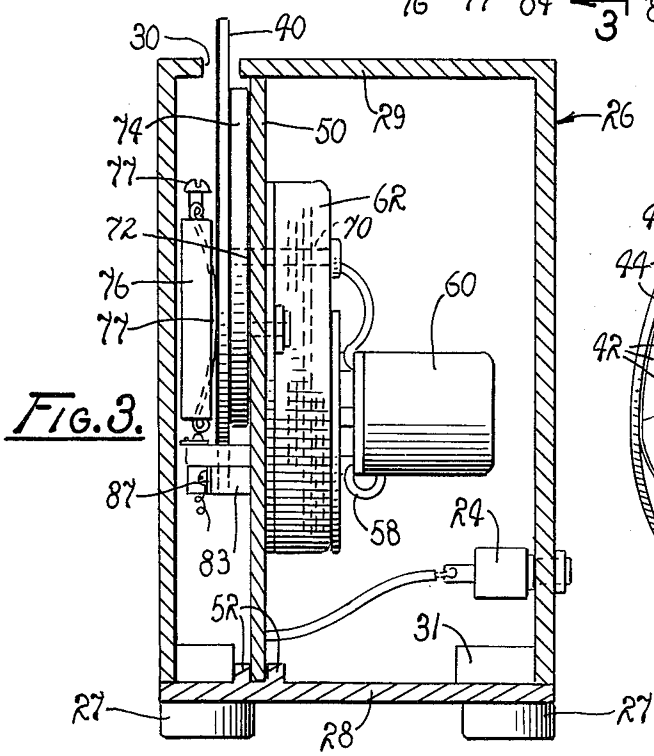
FIG. 3 is a vertical transverse section taken on line 3—3 of FIG. 2.

The housing 26 contains a vertically disposed mounting board 50 slidably mounted between rails 52, as best seen in FIGS. 2 and 3, which can be removed from the housing by first removing the bottom 28. Attached to the mounting board is a bracket 54 having a battery 56 mounted therein. A wire 58 emanating from the battery 56 is connected to a direct current motor 60 mounted on a gear box 62 attached to the mounting board adjacent the bracket. A second wire 64 from the battery 56 is connected to a normally closed actuating microswitch 66 disposed on the opposite side of the mounting board 50 from the gear box 62 with a wire 68 connected to the motor 60 so that closure of the actuating microswitch is necessary for application of power from the battery to the motor 60. The motor has driving connection to the gear box 62.

A shaft 70 is connected to the gear box 62 so as to be driven by the gear box so as to rotate in twenty-one seconds. The shaft extends from the gear box through a bore 72 in the mounting board 50. A circular plate or turntable 74 is mounted on the shaft 70 on the opposite side of the mounting board 50 from the gear box and has a radially extended rectangular key 75 mounted thereon which is adapted to be accepted by the slot 41 of the disc 40 when the key is upright. A receiver 76 is mounted on the key and is adapted releasably to accept the memory disc 40 between the receiver and the circular plate when the radial slot 41 is aligned with and receives the key. A pair of springs 77 are mounted on the receiver so as to grip the memory disc. The key 75 is bonded to the plate 74 and to the receiver 76. These elements are secured to the shaft 70 to rotate therewith by a bolt 78 screwthreadedly mounted in the receiver and tightened against the shaft. As will subsequently become apparent, when the disc 40 is slid downwardly through the aperture 30, the slot 41 receives the key 75. When the disc is shoved downwardly as far as permitted by the slot, it is disposed concentrically of the shaft and the shaft, key, receiver, plate, and disc rotate together. The plate 74 has a projection 79 on the periphery thereof positioned to engage the microswitch 66 to open the switch and thus interrupt the circuit to the motor 60 and terminate rotation of the shaft 70, turntable 74, receiver 76 and disc 40.

Figure 7:
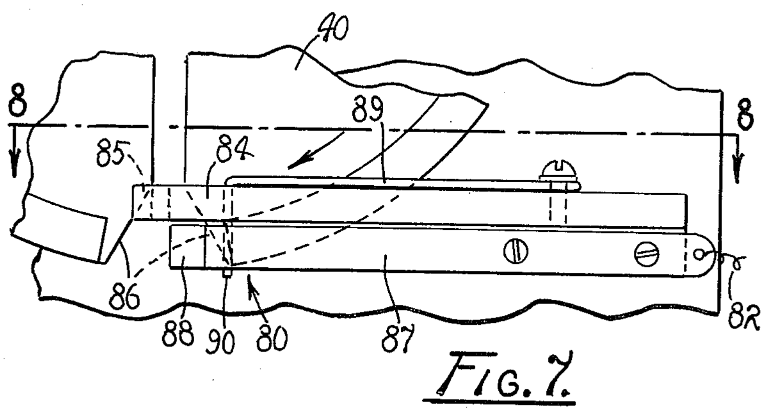
FIG. 7 is a somewhat enlarged portion of FIG. 5 showing the relationship between a scanning switch and memory disc when the apparatus is stopped.

Mounted on the mounting board 50 in spaced relation to the shaft 70 is a normally closed interrupter or scanner microswitch 80, shown in FIGS. 5 and 7, positioned so as to engage the protuberances 42 on the memory disc 40 when it is seated in the receiver 76 and rotating therewith, to open while in contact with each protuberance. Two wires 82 connect the interrupter microswitch with the receptacle 24 on the housing 26 so that when the adapter 18 is inserted into the receptacle 20 the interrupter microswitch is in series with the dialing system of the telephone 12. Thus, every time the interrupter switch is engaged by a protuberance 42, the telephone dialing circuit is briefly interrupted.

Figure 9:
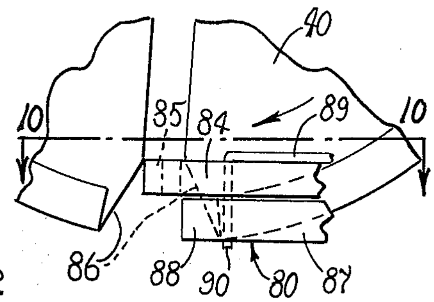
FIG. 9 is a fragmentary view similar to FIG. 7 but showing the memory disc positioned by the scanning switch to initiate a new cycle of operation.
Figure 10:
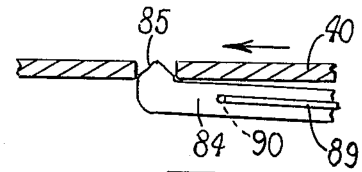
FIG. 10 is a section similar to a portion of FIG. 8 but showing the memory disc and scanning switch in the relative positions shown in FIG. 9.

Referring in greater detail to the scanner switch 80 and particularly as shown in FIGS. 7 through 12, it provides a base 83 rigidly mounted on the board 50. An arm 84 of plastic or other dielectric material is mounted on the base and extended over the edge of the disc. The arm has a downwardly disposed acuminate distal end 85 adapted releasably to fit in the slot 41 of the disc 40. To facilitate receipt of the end 85 in the slot to position the disc in precise rotational position, the outer edges of the slot are preferably beveled, as shown at 86 in FIGS. 4, 5 and 7. The end of the arm is positioned in relation to the switch 66 such that when the disc is slid downwardly between the turntable 74 and the receiver 76 the beveled edges guide the disc onto the distal end of the arm and turn the disc sufficiently to permit the switch 66 to close and actuate the motor 60. This condition is shown in FIGS. 9 and 10.

Figure 11:
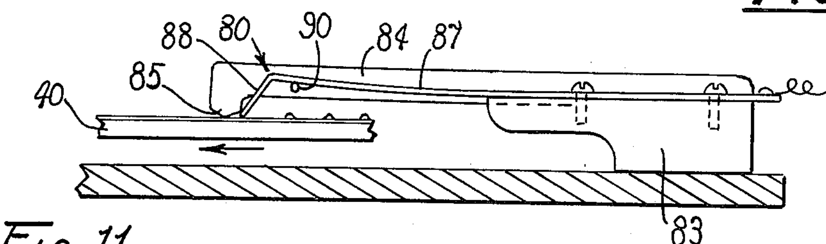
FIG. 11 is a fragmentary horizontal section taken on line 11—11 of FIG. 5 showing the scanning switch in relation to the memory disc when closed.
Figure 12:
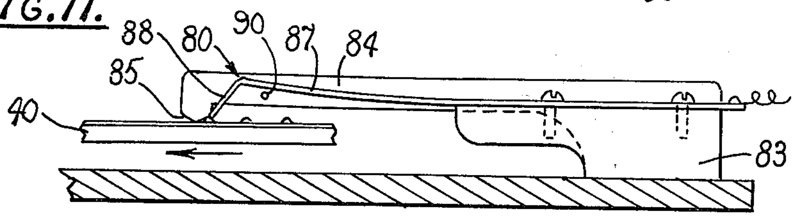
FIG. 12 is a fragmentary horizontal section similar to FIG. 11 showing the scanning switch in relation to the memory disc when open.

Returning to the scanner switch 80, a resiliently flexible electrically conductive finger 87 is mounted on the base 83 and extends alongside of the arm over the disc 40. The finger has an oblique distal end 88 disposed to ride over the tape segments 44 and their protuberances 42 as the disc is rotated, as shown in FIGS. 11 and 12. At the same time, the distal end 85 of the arm 84 rides on the surface of the disc inwardly of the tape segments 44, also as shown in FIGS. 11 and 12. A conductor 89 extends along the arm 84 at the side opposite to the finger 87 and thence transversely through the arm to provide a contact 90 for the finger 87. When the finger and the arm ride on the disc, the finger engages the contact to form an electrical path through the finger and conductor, as shown in FIG. 11. When the finger rides up over a protuberance 42, it disengages the contact to interrupt the path as shown in FIG. 12. When the distal end 85 of the arm seats in the slot 41, the finger remains in engagement with the contact. The wires 82 are individually connected to the finger and the conductor.

It will be noted that battery 56, motor 60, gear box 62, shaft 70, microswitch 66, turntable 74, key 75, receiver 76 and interrupter switch 80 are all mounted on the board 50 and, upon removal of the bottom 28 of the housing 26, can be removed for replacement, repair or adjustment by sliding the board out on the rails 52. It is easily returned to place and the bottom reapplied.

Figure 13:
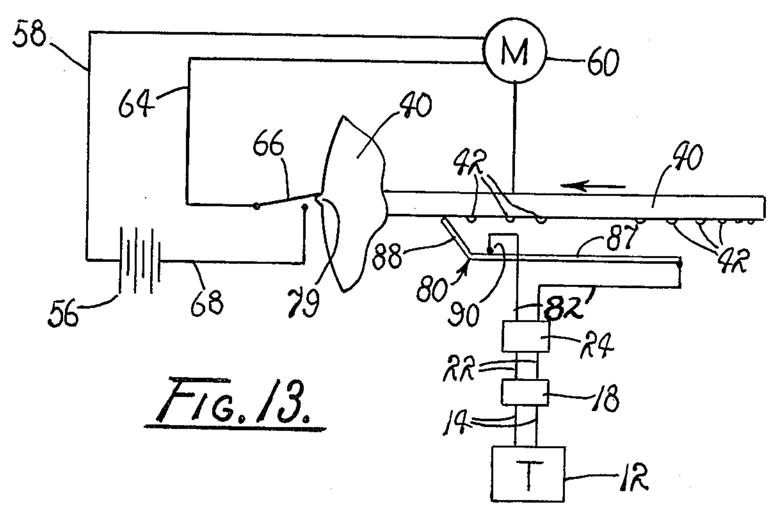
FIG. 13 is a schematic wiring diagram of a motor drive system of the present invention in driving relation to the memory disc which controls the scanning switch which operates the conventional dialing system of a telephone.

As diagrammatically represented in FIG. 13, the motor 60 which drives the memory disc 40 is connected in series with the battery 56 through the switch 66. When the switch is held open by the projection 79, the motor is inoperable. When the switch is closed, the motor drives the shaft 70, turntable 74 and disc 40 carried thereby. As the disc rotates, the protuberances 42 periodically open the scanner switch 80 in series with the dialing circuit of the telephone 12 to dial the number encoded on the disc.

OPERATION

The operation of the described embodiment of the present invention is believed to be clearly apparent and is summarized briefly at this point. The automatic telephone dialing apparatus 10 is connected to a conventional telephone 12 by inserting the adapter 18 between the telephone plug 16 and the wall receptacle 20 which places the normally closed scanner microswitch 80 electrically in series with the dialing system of the telephone. Thus there is no effect on the operation of the telephone dialing system until the microswitch 80 interrupts circuit continuity by engagng a protuberance 42 on the memory disc 40.

The apparatus 10 of the present invention normally includes a number of "blank" discs 40 which can be easily conditioned to represent any seven digit telephone call number plus an area code by the application of selected tape segments 44 thereto.

When the apparatus 10 is inactive, the key 75 mounted on the turntable 74 is in its normally upright position to receive a memory disc 40. A consequence of this position is that the projection 79 on the turntable periphery maintains the actuating microswitch 66 open, thereby inactivating the motor 60. The scanner switch 80 is then in the position shown in FIGS. 7 and 8.

Figure 8:
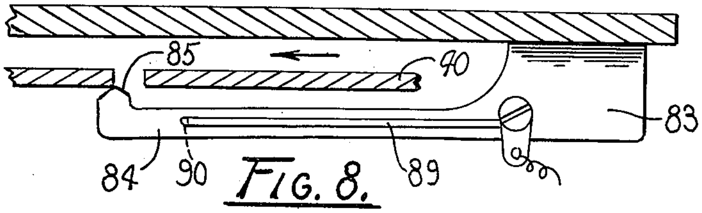
FIG. 8 is a section taken on line 8—8 of FIG. 7 showing such relationship.

To activate the apparatus 10 of the present invention, a memory disc 40 embodying a call number which the calling party desires to reach is inserted in the elongated aperture 30 in the housing 26. As the disc is slid into place, its slot is at first misaligned with the distal end 85 of the arm 84, as shown in FIGS. 7 and 8. When one of the edges 86 engages the arm, further downward movement of the disc rotates the disc and the turntable 74 sufficiently to cause the end 85 to nest in the slot, as shown in FIGS. 9 and 10. Such rotation is sufficient to carry the projection 79 from the microswitch 66 permitting the latter to close and energize the motor 60.

When the motor 60 is energized, the gear box 62 rotates the shaft 70 and the turntable 74 and disc 40 borne thereby. Such action carries the segments 44 under the scanner switch 80. As the oblique end 88 of the switch passes over a protuberance, as shown in FIG. 12, the finger 87 is raised so as to disengage the contact 90 interrupting the dialing system of the telephone 12. As the protuberance passes, the end 88 descends to the disc, as shown in FIG. 11, re-engaging the contact and completing the circuit of the dialing system of the telephone.

After completion of one full rotation of the memory disc 40, the projection 79 again engages the actuating microswitch 66 thereby interrupting power to the motor and stopping rotation of the shaft 70 in the position shown in FIGS. 5, 7 and 8 wherein the key 75 is upright thus allowing the memory disc to be removed from the housing 26 through the aperture 30. It is evident that if the number called is busy, the memory disc need not be removed but can be left in place so that the same call number may again be diâled automatically simply by giving the memory disc another small clockwise turn to permit the switch 66 to close and intitiate another cycle.

The advantage accrued by the separability of the memory discs 40 from the balance of the apparatus 10 of the present invention allows a user with a telephone 12 on his desk to maintain a large number of memory discs at his disposal, e.g. in a nearby file drawer, without using additional desk space therefor. In a similar vein, the fact that no alternating current power connection is needed for the present invention allows greater freedom for location of the apparatus without regard to any necessity for stringing extension wires to an alternating current outlet, as would be required with existing automatic dialing systems.

By the proper selection and application of the tape segments 44 to the disc 40, a disc can be prepared to dial any desired area code and number. If the number is changed, segments can readily be removed and replaced.

The apparatus 10 is economical to produce, easy to install, convenient to use, versatile in its adaptation to new numbers and fully effective in accomplishing its intended function.

Although the invention has been herein shown and described in what is conceived to be the most practical and preferred embodiment, it is recognized that departures may be made therefrom within the scope of the invention.

Having described my invention, what I claim as new and desire to secure by Letters Patent is:

1. An automatic dialing apparatus for telephones having dialing systems operated by coded sequential interruptions thereof comprising:

A. a scanning switch;

B. means for connecting the scanning switch in series with such a system;

C. a rotary turntable;

D. a disc adapted removably to be mounted on the turntable for rotation therewith, 1. the disc having a telephone number encoded thereon in an annular pattern in the form of a succession of series of spaced protuberances with the protuberances being substantially equally spaced in each series, the successive series being sustantially equally spaced and the number of proturberances in each series corresponding to a digit to be dialed by the series;

E. a motor connected to the turntable to rotate the same in a predetermined direction;

F. a source of electrical energy connected to the motor;

G. a normally closed switch in series with said motor and source;

H. means borne by the turntable for rotation therewith engageable with the normally closed switch to open the same after each complete revolution of the turntable;

I. means on the disc for manually rotating the turntable a distance in the direction of motor rotation thereof sufficient to permit the normally closed switch to close and initiate a new motor driven revolution in response to the removable mounting of the disc on the turntable; and J. means mounting the scanning switch in a position to traverse the protuberances on the discs and to be opened by each such protuberance.

2. The apparatus of claim 1 in which the means for manually rotating the turntable comprises a "V" shaped slot on the disc, means for guiding the disc edgewardly toward the scanning switch when it is being mounted on the turntable, and means on the scanning switch engageable with the slot to index the turntable in said predetermined direction incident to edgeward movement of the disc toward the scanning switch.

3. An automatic dialing apparatus for telephones having dialing systems operated by coded sequential interruptions thereof comprising:

A. a disc having a telephone number encoded thereon;

B. rotatable means for releasably mounting the disc for rotation;

C. drive means having driving connection to the rotatable means;

D. means responsive to the rotational position of the disc for rendering the drive means inoperable whenever the disc is in a predetermined stopped position and actuating the drive means whenever the disc is displaced from said stopped position;

E. means for displacing the disc from stopped position in response to the releasable mounting of the disc for rotation on the rotatable means; and F. switch means adapted to be inserted in a telephone circuit responsive to the telephone number encoded on the disc sequentially to interrupt the circuit during disc rotation.

4. The apparatus of claim 3 in which the telephone number is encoded on the disc by arcuate tape segments adhesively mounted on a side of the disc having a succession of series of spaced protuberances extended in an annular pattern therefrom concentrically of the axis of rotation of the disc.

5. The apparatus of claim 4 in which the protuberances are substantially equally spaced in each series, the successive series are substantially equally spaced, and the number of protuberances in each series corresponds to a digit to be dialed by the series.

6. The apparatus of claim 4 in which the tape segments are removable and replaceable.

7. An automatic dialing apparatus for telephones having dialing systems operated by coded sequential interruptions thereof comprising:

A. a disc having a telephone number encoded thereon;

B. rotatable means releasably mounting the disc thereon for rotation therewith;

C. electrically energized drive means having driving connection to the rotatable means;

D. a normally closed switch in series with the drive means;

E. means for opening the switch when the rotatable means is in predetermined stopped position;

F. means for guiding the disc to and from the rotatable means along a predetermined path of movement;

G. means responsive to movement of the disc along the path to the rotatable means for rotating the rotatable means from stopped position to permit the switch to close whereby the drive means rotates the rotatable means until the switch is again opened; and H. switch means responsive to the telephone number encoded on the disc adapted to be inserted in a telephone circuit whereby the circuit is interrupted in coded sequence incident to disc rotation.

8. The apparatus of claim 7 in which the telephone number is encoded on the disc by arcuate tape segments adhesively mounted on a side of the disc having a succession of series of spaced protuberances extended in an annular pattern therefrom concentrically of the axis of rotation of the disc.

9. The apparatus of claim 8 in which the tape segments are removeable and replaceable by other tape segments having different telephone numbers encoded thereon.

10. An automatic telephone dialing apparatus comprising:

A. a turntable;

B. electrically energized drive means for rotating the turntable;

C. a normally closed switch in series with the drive means;

D. a protuberance carried by the turntable engageable with the switch in a predetermined position of the turntable to open the switch to interrupt the drive means whereby the turntable has a predetermined stopped position;

E. a key borne by the turntable having a predetermined position when the turntable is in stopped position;

F. a memory disc having a telephone number encoded thereon provided with a slot removably slidably fitted to the key for unitary rotational movement of the disc with the turntable, said slot having an open end bounded by outwardly divergent beveled edges;

G. means engageable with said beveled edges as the disc is slid onto the key to rotate the turntable sufficiently to displace the protuberance from the switch to permit the switch to to close and actuate the drive means to rotate the turntable until the protuberance again opens the switch; and H. means engageable with the disc adapted to be serially inserted in a telephone circuit periodically to interrupt the circuit in accordance with the telephone number encoded on the disc.

* * * * *

UNITED STATES PATENT AND TRADEMARK OFFICE

CERTIFICATE OF CORRECTION

PATENT NO. : 3,993,876

DATED : November 23, 1976

INVENTOR(S) : William J. Davis

It is certified that error appears in the above-identified patent and that said Letters Patent are hereby corrected as shown below:

Column 3, line 12 delete "proturberances" and substitute --- protuberances --.

Signed and Sealed this

Fifteenth Day of March 1977

[SEAL]

*Attest:*

RUTH C. MASON
*Attesting Officer*

C. MARSHALL DANN
*Commissioner of Patents and Trademarks*